United States Patent
Bhatt et al.

(10) Patent No.: US 10,509,825 B2
(45) Date of Patent: Dec. 17, 2019

(54) SYSTEMS AND METHODS FOR TOPIC GUIDANCE IN VIDEO CONTENT USING SEQUENCE MINING

(71) Applicant: FUJI XEROX CO., LTD., Tokyo (JP)

(72) Inventors: Chidansh Amitkumar Bhatt, Mountain View, CA (US); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 227 days.

(21) Appl. No.: 15/656,945

(22) Filed: Jul. 21, 2017

(65) Prior Publication Data
US 2019/0026291 A1   Jan. 24, 2019

(51) Int. Cl.
*G06F 17/30* (2006.01)
*G06F 16/78* (2019.01)
*G06F 16/74* (2019.01)
*G06F 16/2458* (2019.01)
*G06F 16/2457* (2019.01)

(52) U.S. Cl.
CPC ...... *G06F 16/7867* (2019.01); *G06F 16/2465* (2019.01); *G06F 16/24578* (2019.01); *G06F 16/743* (2019.01)

(58) Field of Classification Search
CPC .................................................. G06F 16/00
See application file for complete search history.

(56) References Cited

U.S. PATENT DOCUMENTS

| | | | | |
|---|---|---|---|---|
| 2014/0377732 | A1* | 12/2014 | Freedman | G09B 5/10 434/322 |
| 2015/0286718 | A1* | 10/2015 | Wang | G06F 16/7844 707/738 |
| 2017/0228614 | A1* | 8/2017 | Gandhi | G06K 9/6215 |
| 2018/0060984 | A1* | 3/2018 | Gandhi | G06Q 50/205 |

OTHER PUBLICATIONS

Adcock, J., et al., TalkMiner: A Lecture Webcast Search Engine, In Proceedings of the 18th ACM International Conference on Multimedia, MM'10, Oct. 25-29, 2010, Firenze, Italy, pp. 241-250.
Allan, J., editor, Topic Detection and Tracking: Event-Based Information Organization, 2002, Kluwer Academic Publishers, 4 pgs.

(Continued)

*Primary Examiner* — Khanh B Pham
(74) *Attorney, Agent, or Firm* — Porcopio, Cory, Hargreaves & Savitch LLP

(57) ABSTRACT

Example implementations are directed to systems and methods for developing a topic model for a set of video series that include overlapping topics, wherein each video series includes segments directed to one or more of topics, wherein the topic model is based on topic distributions detected from the segments; analyzing auxiliary information, for each video series, to determine sequence information for the segments of the video series; and generating an array for topic transitions using sequence pattern mining on the distributions and the sequence information, wherein a next segment is determined for a selected segment based on an alignment decision using the array and sequence based scoring.

17 Claims, 8 Drawing Sheets

(56) References Cited

OTHER PUBLICATIONS

Alsumait, L., et al., On-Line LDA: Adaptive Topic Models for Mining Text Streams with Applications to Topic Detection and Tracking, In Data Mining, ICDM/08, Eighth IEEE International Conference, 2008, p. 3-12.
Blei, D. M., et al., Latent Dirichlet Allocation, Journal of Machine Learning Research, 2003, 3, pp. 993-1022.
Cataldi, M., et al., Emerging Topic Detection on Twitter Based on Temporal and Social Terms Evaluation, In Proceedings of the Tenth International Workshop on Multimedia Data Mining, MDMKDD'10, Jul. 25, 2010, Washington D.C., 10 pgs.
Chuang, J., et al., Without the Clutter of Unimportant Words: Descriptive Keyphrases for Text Visualization, ACM Trans. Comput.-Hum. Interact., 19(3), Oct. 2012, 29 pgs.
Fournier-Viger, et al., TKS: Efficient Mining of Top-K Sequential Patterns, In Proceedings of the 9th International Conference on Advanced Data Mining and Applications (ADMA 2013), 2013, 12 pgs.
Fournier-Viger, P., et al., Mining Top-K Non-Redundant Association Rules, In Proceedings of the 28th Symposium on Applied Computing (ACM SAC 2013), 2013, 10 pgs.
Kinnebrew, J. S., A Contextualized, Differential Sequence Mining Method to Derive Students' Learning Behavior Patterns, Journal of Educational Data Mining, 5(1), Apr. 2013, pp. 190-219.
Manning, C. D., et al., An Introduction to Information Retrieval, 2009, Cambridge University Press, 8 pgs.
Ramesh, A., et al., Understanding MOOC Discussion Forums using Seeded LDA, Proceedings of the Ninth Workshop on Innovative Use of NLP for Building Educational Applications, Jun. 26, 2014, Baltimore, MD, pp. 28-33.
Varadarajan, J., et al., A Sequential Topic Model for Mining Recurrent Activities from Video and Audio Data Logs, International Journal of Computer Vision, 2013, 103(1), pp. 100-126.
Wang, Y., et a., TM-LDA: Efficient Online Modeling of Latent Topic Transitions in Social Media, In Proceedings of the 18th ACM SIGKDD International Conference on Knowledge Discovery and Data Mining, Aug. 12-16, 2012, Beijing, China, pp. 123-131.
Zhu, Q., et al., VideoTopic: Content-Based Video Recommendation Using a Topic Model, 2013 IEEE International Symposium in Multimedia, 2013, pp. 219-222.

* cited by examiner

SYSTEMS AND METHODS FOR TOPIC GUIDANCE IN VIDEO CONTENT USING SEQUENCE MINING

BACKGROUND

Field

The present disclosure is generally directed to analyzing content for topic guidance, and more specifically to systems and methods for topic guidance using sequence mining of video content.

Related Art

Streaming video content and video-based communication is gaining in popularity, creating large volumes of recorded video content directed to entertainment, education, hobbies, skill development, etc. For example, a massive open online course (MOOC) is a video-based online course aimed at unlimited participation and open access via the Internet that may include participants watching a series of recorded videos for a subject. Institutions, organizations, and content publishers are amassing large databases of recorded video content spanning the full spectrum from one-off how-to videos to full for-profit, professionally produced, multi-course certification programs available via the Internet.

Video-based courses for a particular subject typically include several video segments that each include one or more specific concepts related to the subject. Generally, an instructor or producer selects which specific concepts to include for the course and arranges the topics into the segments. Various factors can impact the design of a course, such as a prescribed curriculum, objectives, and access to materials. For example, teachers generally employ a syllabus to select specific concepts and organize the presentation of the concepts.

A growing number of platforms and instructors have designed video-based courses for common subjects that include diverse arrangements of concepts and teaching methods with differing levels of effectiveness. Conventionally, a viewer (e.g., student, employee, hobbyist, etc.) selects a specific videos series for a subject and completes the series of video segments as designed and organized by the instructor. However, despite the fast-paced growth of educational video content and enthusiastic interest for the convenience and accessibility of the video content, viewers generally struggle to complete video-based courses. For example, a viewer may discover several segments into the series that they are missing a foundational skill, need to refresh pre-requisite information, dislike the pace or presenter, etc. Related art studies have shown that video-based courses designed using a one-size-fits-all approach suffers from common attention attrition problems.

Related art systems are not designed to allow viewers to jump between different series of videos to locate relevant topics that contribute to comprehending the particular subject. Typically, when a viewer switches to a different video series for the same subject, the viewer restarts from the beginning of the new series, guesses which segments of the new series might have relevant information, or gives-up completing the subject. Generally, related art systems cause the viewer to re-watch large amounts of redundant or superfluous topics that may be incoherent, confusing, and disconnected with the original video series.

Further, video series are generally designed and organized independent from other video series for the same subject. For example, a video series designed to be a comprehensive study of a subject may be organized very differently from an abridged video series designed by a different instructor or by an unaffiliated institution. Thus, viewers are generally unable to coherently or logically transition between multiple series even though the different series including overlapping topics. For example, online course aimed at unlimited participation and open access are limited by the ability to address a diversity of learner profiles. Improved production and distribution of video content is increasing video-based education and employment training, as well as, spurring life-long learners to pick up new skills. Therefore, tools are needed for viewers to leverage different series of video content related to a common subject.

In the related art, topic detection in text content has been used to group and model similar topics from different sources, for example, different news sources or social-media platforms discussing a common event. In other related art, video recommendation techniques assign categories to video segments and recommend a new video segment that is classified in the same or similar category as the previously viewed video segment. Related art video recommendation tools contribute to viewer attrition and course drop-out rates by recommending disorienting video segments that typically include redundant or superfluous topics.

SUMMARY

Aspects of the present disclosure may include a system and method of generating recommendations to transition between independent content series while maintaining topic coherency.

Example implementations are directed to systems and methods for developing a topic model for a set of video series that include overlapping topics, wherein each video series includes segments directed to one or more of topics, wherein the topic model is based on topic distributions detected from the segments; analyzing auxiliary information, for each video series, to determine sequence information for the segments of the video series; and generating an array for topic transitions using sequence pattern mining on the distributions and the sequence information, wherein a next segment is determined for a selected segment based on an alignment decision using the array and sequence based scoring.

Additional aspects of the present disclosure may include providing one or more target video segments based on an ordered list of candidate segments in response to receiving a query for a selected video segment. The method may include determining an ordered list of candidate segments based on content-based similarity using vector space modeling in view of the array for topic transitions; determining a set of scores for each candidate segment based on the sequence based scoring in view of the selected segment, wherein the sequence based scoring weights candidate segments directed to non-redundant topics that align with topics of the selected segment; re-ordering the list of the candidate segments based on the set of scores; and recommending the next segment based on the re-ordered list of candidate segments.

According to an example aspect of the present disclosure a computing device may be provided that is configured to develop a topic model for a set of video series that include overlapping topics, wherein each video series includes segments directed to one or more of topics, wherein the topic model is based on topic distributions detected from the segments; for each video series, analyze auxiliary information to determine sequence information for the segments of the video series; and generate an array for topic transitions using sequence pattern mining on the distributions and the sequence information, wherein a next segment is determined for a selected segment based on an alignment decision using the array and sequence based scoring.

A non-transitory computer readable medium, comprising instructions that when executed by a processor, the instructions analyze series of video content from different sources to generate global sequential rules based on the frequent sequence patterns so that the alignment decision using the array to weight a set of candidate segments is to reduce redundant topics between the next segment and the selected segment.

According to another aspects of the present disclosure, a non-transitory computer readable medium may include instructions that when execute by a processor, the instructions to: develop a topic model for a corpus of content series for a common subject from different sources, wherein each content series comprises content segments for topics of the common subject, wherein the topic model is based on topic distributions detected from the segments; for each content series, analyze a syllabus associated with the content series to determine sequence information for the segments of the video series; generate an array for topic transitions using sequence pattern mining on the distributions and the sequence information, wherein a next segment is determined for a selected segment based on an alignment decision using the array and sequence based scoring.

The instructions of the non-transitory computer readable medium can also determine an ordered list of candidate segments based on content-based similarity using vector space modeling in view of the array for topic transitions; determine a set of scores for each candidate segment based on the sequence based scoring in view of the selected segment; re-order the list of the candidate segments based on the set of scores; and recommend the next segment based on the re-ordered list of candidate segments.

Other features and advantages of the present concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
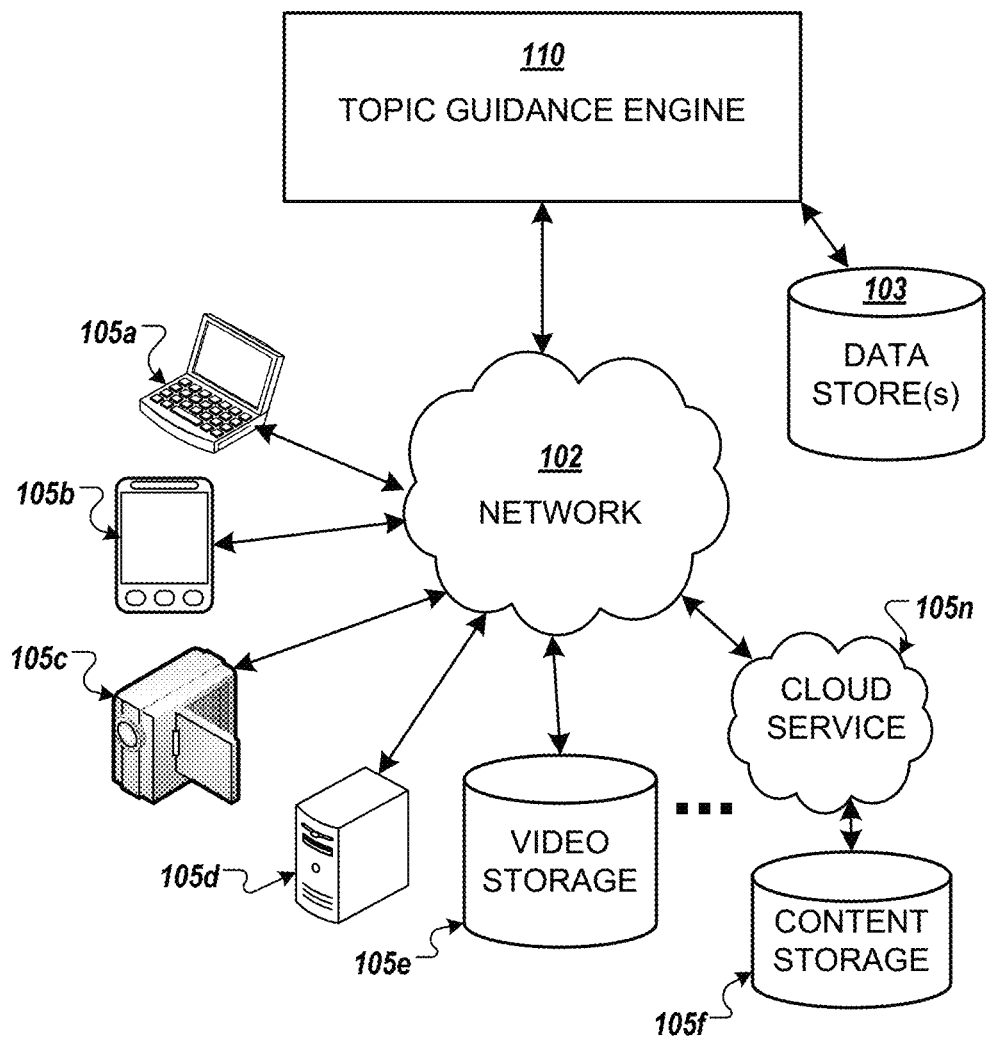
FIG. 1 illustrates an overview of a system for use with a topic guidance engine according to example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

The exponential growth of digital content is creating new hurdles for people to efficiently locate and consume relevant information. Video communications generally improve the consumption rate of information but are challenged by poor navigation tools as compared to searchable text. However, viewers of recorded educational content, for example, in a Massive Open Online Courses (MOOC) are unable to quickly locate relevant videos that are not manually integrated or designed into the course.

An example aspect of the present disclosure relates to tools for providing users with options and recommendations to switch between segments of independently produced video series that promote topic coherence and minimize redundancy. Example implementations apply sequential pattern mining and probabilistic distributions of frequent topic transitions on large collections of independent content that relate to a common subject. For example, a user learning about heavy equipment maintenance via a video course can be provided with recommendations to view video segments from a mechanical engineering lecture provided by an academic institution. The recommended video segments are selected to seamlessly and coherently transition topics between independent video series on a common subject. Recommendations guide a user across several independently designed courses to efficiently provide the most relevant information while avoiding redundant topic coverage.

Method and systems as discussed herein provide users with access to more diverse content from siloed platforms based on inter-topic relationship. Example implementations automatically mine sequential inter-topic information into a model for a guidance engine that outputs recommendations for switching between video segments on different platforms. The method can analyze large collections of content to mine frequent topic sequences and transitions that can be combined with the user's viewing history to identify relevant topic recommendations based on probabilistic distributions ad previously covered topics. Multiple series of content that address a common subject can be identified and each segment of the series analyzed to detect topics and track topic transitions; create a common topic structure based on the detected topics from different video series; analyze descriptions of each series to identify frequent topic patterns; and generate a latent topic model with inter-topic relationships and frequent topic transitions. Systems and methods described herein utilize both content based similarity between videos, as well as, mined knowledge of topic transitions, for example, from an instructors' syllabi or logs of view history.

Some related art topic-based recommender systems recommend similar videos but fail to consider topic transitions in the sequence of videos that students consume from one video lecture to the next within a course. Further, systems and methods described herein are adaptable to use the published information for the content that is made available for analysis rather than firewalled propriety relationship management and customer tracking data needed for related art customer purchase sequence approaches.

An example aspect of the present disclosure allows for adding content or documents to the corpus and using the existing topic models, mined pattern sequences, guidance models, etc. without having to recreate each element. That is, the training process adapts to add sequence patterns rather than rebuilding models in response to a content change. Content level similarity along with sequence patterns of latent topics are used to recommend a sequence of videos that reinforces conceptual sequential consistency to handle updates to content that periodically change, for example, with new instructors, updated editions, evolving trends, etc.

The systems and methods described herein provide a domain independent, scalable approach to providing video-based courses that to cater to a diversity of learner profiles. The use of a global topic model and sequence based recommendation improves the learning experience by allowing users to more seamlessly consume videos across independent siloed platforms while avoiding redundant conceptual content. The systems and methods discussed herein can be used for topic guidance on a large and/or growing corpus of content, for example, a collection of thousands of video lectures with text transcripts and metadata (e.g., title, description, likes/dislike count, date, uploader, views, tags, average ratings, etc.) from diverse platforms (e.g., Coursera Udacity, MOOC, presentation slide videos, lecturer face videos, classroom lectures, instructor writing code in a text editor, freehand ink on a digital tablet, etc.).

The systems and methods described herein can be extended to other domains where the sequence based recommendation guide a user to proceed to a next segment directed to a non-redundant topic that aligns with a previous segment by using the frequent topic transitions and sequence information. The systems and methods described herein can be implemented to recommend, for example, book chapters or paragraphs with sequence of knowledge or how-to videos with sequence of actions to be performed. Although video content is discussed herein as an example, the medium of content can be varied in design, function, configuration, or implementation and are not limited to the video examples provided.

FIG. 1 illustrates an overview of a system 100 for use with a topic guidance engine 110 according to example implementations. The system 100 includes a topic guidance engine 110 configured to analyze video content from a local data store 103 or via a network 102 from a video storage 105e or content storage 105f via cloud service 105n. The topic guidance engine 110 can analyze a corpus of content with series of content independently created from one or more different sources (e.g., video storage 105e, content storage 105f).

The topic guidance engine 110 can interact with client devices 105a-105n, content platform 105d, cloud services 105n, etc. and to analyze series of content and provide recommendations for content segments. The topic guidance engine 110 may be implemented in the form of software (e.g., instructions on a non-transitory computer readable medium) running on one or more processing devices, such as the one or more devices 105a-105d, as a cloud service 105n, remotely via a network 102, or other configuration known to one of ordinary skill in the art.

The topic guidance engine 110 directly or indirectly includes memory such as data store(s) 103 (e.g., RAM, ROM, and/or internal storage, magnetic, optical, solid state storage, and/or organic), any of which can be coupled on a communication mechanism (or bus) for communicating information. The terms "computer", "computer platform", processing device, and device are intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks.

In an example implementation, the topic guidance engine 110 can be hosted by a cloud service 105n and communicatively connected via the network 102 to devices 105a-105n in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Devices 105a-105n can include, for example, mobile computing devices 105a-105b (e.g., smart phones, laptops, tablets, etc.), presentation systems 105c, computing devices 105d (e.g., desktops, mainframes, network equipment, etc.), multimedia libraries 105e, as well as cloud services 105n (e.g., remotely available proprietary or public computing resources). Devices 105a-105n can access content, for example video streaming services, with functionality, for example to collect, transmit, and/or store video data and metadata. For example, a mobile computing device 105a can include a content viewer (e.g., video player) and access an online video-based service 105n to view content from a first source (e.g., content storage 105f) and receive a recommendation from the topic guidance engine 110 to view a content segment from a second source (e.g., video storage 105e).

Devices 105a-105n may also collect information (e.g., content history data, viewer profile data, feedback data, etc.) from one or more other device 105a-105n and provide the collected information to the topic guidance engine 110. For example, devices 105a-105n can be communicatively connected to the other device using WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The topic guidance engine 110 recommends video segments based on inter-topic relationships from a corpus of content with related topics from multiple domains (i.e. sources). In example implementations, the topic guidance engine 110 accesses content from a video streaming session (e.g., via a device 105a-105d, or cloud service 105n) or recorded video session (e.g., video library 105e, content storage 105f), analyzes the content according to one or more algorithms as described herein, and provides access to a guidance model for servicing recommendation requests. In an implementation, a guidance model for mined sequence patters of a corpus of content is provided to generate recommendations to view a target segment based at least on a selected segment of content, where the target segment is directed to a topic that is relevant to the selected segment, where the target segment can be from a different domain that the selected segment, as described in reference to FIGS. 2-7.

Figure 2:
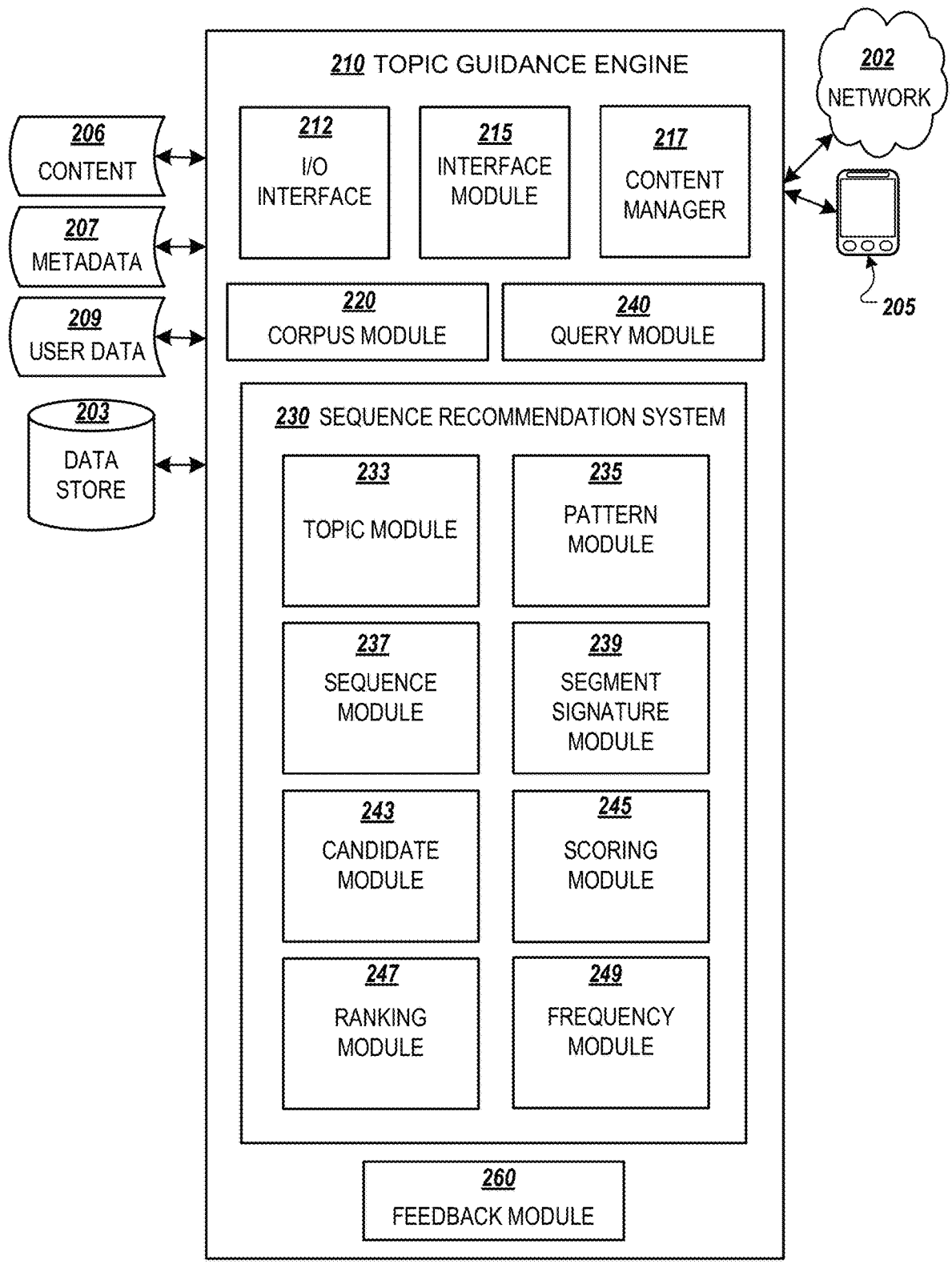
FIG. 2 illustrates an example topic guidance engine in accordance with an example implementation.

In an example implementation, the topic guidance engine 110 develops topic model based on topic distributions detected from the segments of the series. Auxiliary information for each video series is used to determine sequence information for the segments. The topic guidance engine 110 determine frequent topic transitions using sequence pattern mining on the distributions from the topic model and the sequence information from the auxiliary information. For example, topic guidance engine 110 can guide a user watching segments of a first video series to switch a segment from a second video series by recommend a target segment of the second video series. The topic guidance engine 110 determines a target segment based on an alignment decision using the topic distributions and sequence based scoring, as described in reference to FIGS. 2-7. An alignment decision using identifies the target segment from the set of candidate target segments to recommend based on a selected query segment. The set of candidate segments can be ordered based on content-based similarity using vector space modeling in view of the array for topic transitions, and then re-ranked based on the sequence based scoring using scoring criteria including topic similarity, topic diversity, sequence rules, previous segment cohesion, and next segment cohesion. The alignment decision uses scoring criteria to determine which candidate target segment out of the set is directed to a topic that best aligns with a topic of the selected segment. The recommended target segment is this highest rank candidate target segment based on frequent topic transactions weighted by sequence information (e.g., using the auxiliary information). FIG. 2 illustrates an example system 200 including a topic guidance engine 210 in accordance with an example implementation. The topic guidance engine 210 includes one or more I/O interfaces 212, an interface module 215, a content manager 217, a sequence recommendation system 230, and a feedback module 260. The topic guidance engine 210 is coupled to one or more data stores 203 for storing data (e.g., content, models, auxiliary information, synopsis, segment signatures, recommendations, etc.). The topic guidance engine 210 can discern patterns from the corpus of content to detect topics, develop a common topic vocabulary (e.g., domain independent), and generate a topic model to mine frequent topic transition and analyze auxiliary information to discern sequence patters. Multiple series of video content with overlapping or related topics are processed to build a guidance model for a common subject.

In an example implementation, the I/O interface 212 includes one or more communication interfaces communicatively connected with a network 202 or different types of devices 205 (e.g., devices 105a-105n of FIG. 1.) The I/O interface 212 can receive content 206 (e.g., videos) from different sources, such as a data store 203, different types of devices 205, or via a network 202. Further, the I/O interface 212 can receive metadata 207 from different sources, such as a data store 203, different types of devices 205, or via a network 202. In an example implementation, the I/O interface 212 can receive a live stream of content 206 and metadata 207 via the network 202.

In another implementation, the I/O interface 212 can receive content 206 from the data store 203 and metadata 207 via the network 202. In another implementation, the I/O interface 212 can receive content 206 and metadata 207 from one or more devices 205. That is, the topic guidance engine 210 can receive, via the I/O interface 212, content 206 and metadata 207 from a variety of sources in different formats and provide an interface, via the interface module 215, to various end devices or cloud services. The combinations listed here are illustrative examples, and other combinations as would be understood by those skilled in the art may be substituted therefore.

Content 206, metadata 207, and/or user data 209 can be received by the topic guidance engine 210 in real-time or retrieved from data store 203 or data sources via the network 202. For example, content 206 can include a transcript of audio from a live or recorded video. Content 206 can also be analyzed to extract visual information, such as audio data or visual presentation materials during a video segment. Metadata 207 can include a summary of the content as auxiliary information, for example, an outline, synopsis, syllabus, viewer history log, index, abstract, etc. Metadata 207 or user data 209 can also include supplemental information about a user, such as, location, demographics, profile information, a course enrollment history, viewing history, requests for a recommendation, responses or reaction to recommendations, etc.

Content manager 217 can process received data (e.g., content 206, metadata, 207, user data 209, etc.) as well as search or request additional data. The content manager 217 can monitor data sources for changes (e.g., additions, modifications, deletions, etc.) and update the topic guidance engine 210 can update related recommendations. For example, the content manager 217 can search (e.g., crawl, scrape, monitor, subscribe, receive notifications) an educational institution's website that hosts videos (e.g., content 206) and auxiliary information (e.g., syllabi 207) for changes. In response to a change to a data source, the topic guidance engine 210 can update, for example, a topic model to include any new content avoid recommending content that is no longer available.

The topic guidance engine 210 includes a corpus module 220 and query module 240 to analyze content 206 and metadata 207, process requests for recommendations (e.g., a selected segment identifier and/or supplemental content), and provide recommendations. The corpus module 220 and query module 240 interact with the sequence recommendation system 230 according to the one or more algorithms described in reference to FIGS. 3-7. The corpus module 220 via the sequence recommendation system 230 analyzes content 206 and metadata 207 for a common subject to generate a guidance model. The corpus module 220 can interact with the I/O interface 212, interface module 215, content manager 217, the sequence recommendation system 230, and feedback module 260 to generate and maintain guidance models. A guidance model can be generated for each common subject. Content can be used to generate more than one guidance model.

The query module 240 receives requests to provide recommendations for content based on at least a selected segment. The query module 240 can interact with the I/O interface 212, interface module 215, content manager 217, the sequence recommendation system 230, and feedback module 260 to provide a recommendation using a guidance model. In some example implementations, the query module 240 employs the user data 209 to process the request. A request for a recommendation can be automatically generated or internally requested by the topic guidance engine 210. For example, as part of providing a first segment of content, the topic guidance engine 210 can request the query module 240 provide a recommendation for a target segment based the first segment with receiving a request from a user or user data 209.

The sequence recommendation system (SRS) 230 can include a topic module 233, a pattern module 235, a sequence module 237, a segment signature module 239, a candidate module 243, a scoring module 245, a ranking module 247, and/or a frequency module 249. The SRS 230 interacts with the corpus module 220 and query module 240 according to the one or more algorithms described in reference to FIGS. 3-7. In an example implementation, the SRS 230 includes an analysis process to learn topic patterns, identify context specific keywords, and determine frequent top transitions from the content 206 and metadata 207.

According to an example implementation, the topic guidance engine 210 can process a corpus of content, such as a set of video series. For example the corpus can include a first video series, with segments of the first video series are recorded lectures, and auxiliary information of the first video series is a syllabus with a sequence of topics for the segments of the first video series. The corpus can include at least a second video series where segments of the second video series are different recorded lectures with one or more topics that overlap with the first video series. Auxiliary information of the second video series can be a syllabus with a different sequence of topics for the one or more topics that overlap. The topic guidance engine 210 uses the guidance model to determine the target segment from a set of candidate segments from multiple different series, such that the target segment is directed to a non-redundant topic that aligns with topics of a current segment from the first series.

According to an example implementation, the SRS 230 analyzes a corpus of content to generate a guidance model. For example, multiple methods for topic detection can be employed that utilize Latent Dirichlet Allocation (LDA), seeded-LDA, online LDA, Top-K sequential pattern mining, Top-K non-redundant sequential rules, etc. as discussed in greater detail below. The topic module 233 analyzes received data (e.g., content 206 and metadata 207) and creates a topic models for use by the topic guidance engine 210. The pattern module 235 can determine domain specific topics and context factors using syntax analysis. The topic module 233, the pattern module 235, the sequence module 237, the segment signature module 239 of SRS 230 are used to develop topic models and rules that can include determining a distribution for a segment of content to topics. In an example implementation, the sequence module 237 analyzes metadata 207 to mine sequence patterns from identified topics. For example, lexical and syntactic patterns are used to detect topic transitions and sequences. A training process is implemented to fully automate empirical evaluation of content 206 and metadata 207 based on training data or dynamically updated models as described in further detail in reference to FIGS. 3-7. In an example implementation, the SRS 230 interacts with the interface module 215 to actively provide topic guidance for a common subject among independent content series.

The feedback module 260 is configured to provide evaluation information back to the SRS 230 for refining and improving the SRS 230 functionality. For example, the feedback module 260 can gather viewer input to identify new data sources, update topics, and/or improve recommendations. The feedback module 260 can collect evaluation information from the user to adapt the detected topics, sequences, and recommendations over time.

Figure 3:
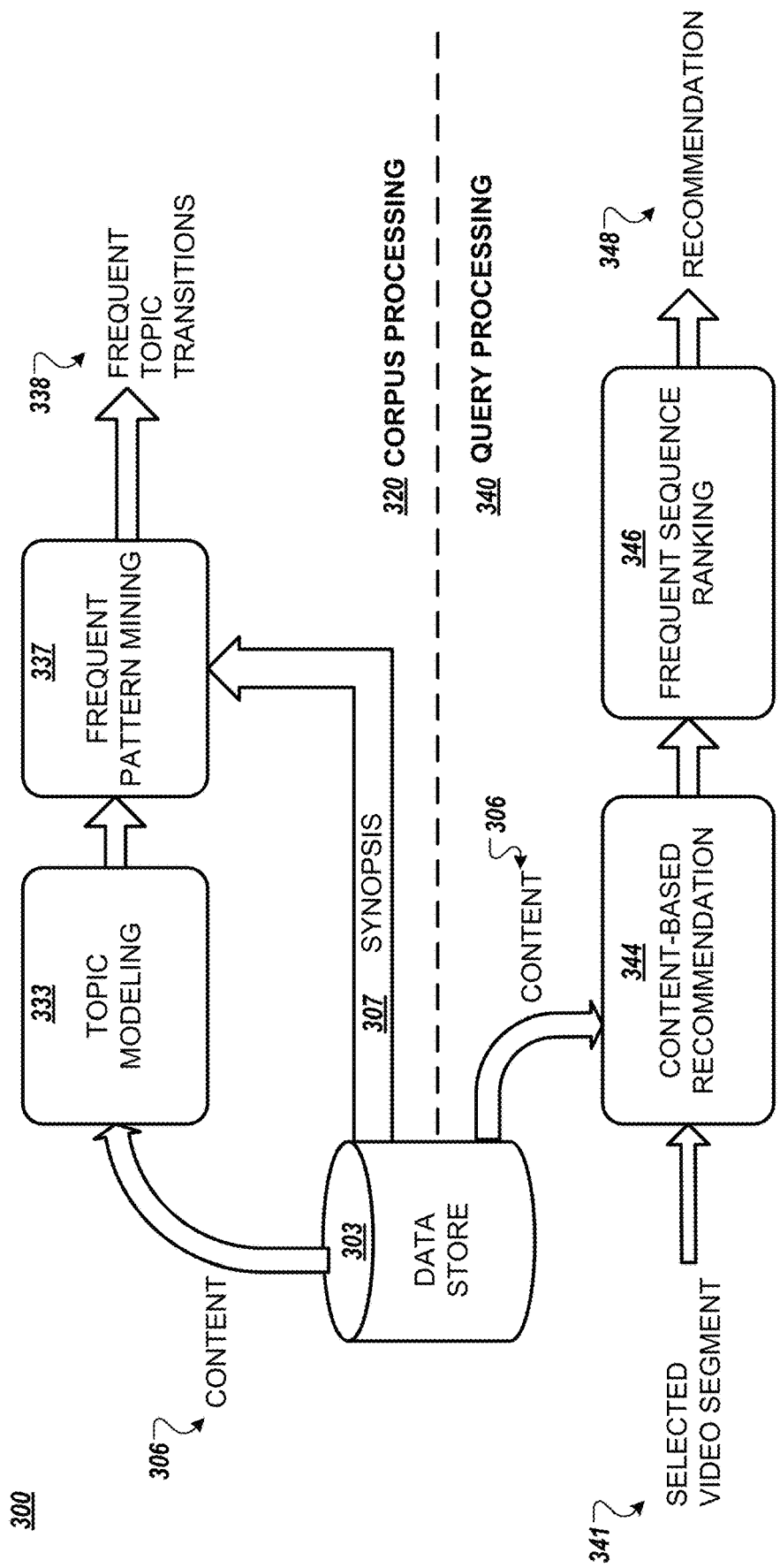
FIG. 3 illustrates an example diagram for recommending a candidate target video segment in accordance with an example implementation.

FIG. 3 illustrates an example diagram 300 of a process for recommending a candidate target video segment in accordance with an example implementation. The diagram 300 is may comprise hardware (circuitry, dedicated logic, etc.), software (such as operates on a general purpose computer system or a dedicated machine), or a combination of both. The diagram 300 represents elements and combinations of elements for use with the guidance engine 110 of FIG. 1 and 210 of FIG. 2.

The diagram 300 depicts a corpus process 320 and a query process 340. The corpus process 320 depicted above the dashed line can be performed asynchronously from the query process 340 depicted below the dash line using a common data store 303 or data sources for content 306. The corpus process 320 can be repeated to update the output models when content in the corpus is modified, expands, or otherwise changes. The query process 340 can be repeated to update the output recommendations when a recommendation request, content delivery request, instruction, or the like is received.

The corpus process 320 use topic modeling (e.g., LDA) to learn topics across all courses in corpus and associate each video with a distribution over the topics. The corpus process 320 applies natural language processing to learn a latent topic model of the courses' content so that each segment is associated with a distribution over a discrete set of topics. For example, the corpus process 320 can use LDA, probabilistic latent semantic analysis (pLSA), seeded-LDA, or online LDA, etc. to generate topic models for the corpus. LDA is natural language processing technique to create a generative probabilistic model for collections of discrete data such as video corpora.

Sequential pattern mining and sequential rule mining are used to detect latent topic transition. Learned latent topic distributions of each video and the video sequence information (e.g., from syllabus) are used to perform sequence pattern mining. Topic, as used herein, refers to actual subject topic of video segments as well as the latent topic generated from LDA modeling. In an example implementation, the corpus process 320 uses LDA to model, via Topic modeling module 333, the collection (e.g., corpus in data store 303) of content series. The collection of content for a common subject may include some content that was produced independently from other series in the collection or content from a different data source. The corpus can include a set of video series for a common subject with segments directed to overlapping topics. A topic model is developed for the corpus where the topic model is based on topic distributions detected from the segments. For example a three-level hierarchical Bayesian model can be used to model each item of the collection as a finite mixture over an underlying set of topics and each topic is modeled as an infinite mixture over an underlying set of topic probabilities. For example, the topic probabilities can provide an explicit representation of auxiliary information (e.g., for text-based modeling). In LDA, each item may be viewed as a mixture of various topics where each item is considered to have a set of topics that are assigned to it via LDA.

A synopsis 307 (e.g., auxiliary information) for each video series is analyzed to determine sequence information for the segments of the video series. Pattern mining can used to learn relationships between topics across all syllabi in a corpus. Auxiliary information can be a syllabi, synopsis, user log, document, etc. that indicate an instructors' sequencing of course topics or framework for the segments in a series of videos.

The corpus process 320 uses frequent pattern mining module 337 to perform sequential pattern mining. Sequential pattern mining finds frequent sub-sequences in a sequence database. In sequential pattern mining, a sequence s is said to be a sequential pattern if and only if support(s)≥minsup, for a threshold minsup set by the user. TKS (Top-K Sequential pattern mining) automatically fine-tunes the minsup parameter. In an example implementation, frequent pattern mining module 337 represents the topic distributions as a binary sequence using a threshold and then applies a Top-K sequential pattern mining (TKS) algorithm to extract a set of frequent topic transitions within a threshold pattern length or pattern length range. The pattern length range can include a minimum pattern length value and maximum length value. The threshold is determined based on the observed number of videos within a topic for a given courses. For example, frequent pattern mining module 337 can use a minimum pattern length of 3 and maximum length of 6.

The corpus process 320 uses global sequential rules and local sequential rules. Local patterns mine sequence patterns which that include list of latent topics representing a selected video segment 341. Global patterns mine the sequence patterns that are more frequent across the corpus. The global patterns are not tailored for specific sub-set of latent topics representing the selected video segment 341. Frequent pattern mining module 337 applies a Top-K non-redundant sequential rules (TNS) algorithm on frequent topic patterns extracted from global courses' topic-level sequence database to mine sequential rules. Sequential rule mining discovers sequential rules of the form X→Y, indicating that if some items X appear in a sequence it will be followed by some other items Y with a given confidence. For example, TNS generates non-redundant rules and returns fast results for the confidence or probability of frequent sequence item co-occurrences.

The corpus process 320 also applies frequent sequence mining at the level of each video with criteria that TKS discovers frequent patterns containing latent topic signature of the video as the seed. The TNS can mine sequential rules from the locally generated frequent patterns at each video level. The corpus process 320 identifies frequent topic transitions 338 as a guidance model for guiding users to relevant video segments using the query process 340.

The query process 340 provides a recommended target segment 348 from the collection of content 303 for the common subject to follow a selected segment 341. The recommended target segment 348 is determined for the selected video segment 341 based on an alignment decision using the topic-based representation for all videos in the corpus (e.g., topic distributions) and sequence ranking (e.g., sequence based scoring). The query process 340 determines a set of potential target segment based on content similarity using term frequency and inverse document frequency (tf-idf) and cosine similarity. The set of potential target segment are further analyzed to calculate sequence based scores that leverage sequence information from an auxiliary source (e.g., a syllabus) and local sequence rules. The query process 340 determines a recommendation 348 for a target segment with topics that align with the selected video segment 341 using sequence based scoring. The sequence based scoring calculates a set of scores for each potential target segment based on factors including topic similarity, topic diversity, sequence rules, previous segment cohesion, and next segment cohesion.

The query process 340 can be repeated to update the output recommendations when a recommendation request, content delivery request, instruction, or the like is received. The query process 340 uses content based recommendation module 344 and frequent sequence ranking module 346 to recommend a target segment 348 to follow the selected video segment 341.

The content based recommendation module 344 uses content based text similarity ranking pipeline to determine an ordered list of candidate segments. For example the content based recommendation module 344 determines content-based similarity using vector space modeling in view the mined topic transitions. The frequent sequence ranking module 346 calculates sequence based scores that re-ordering the list of the candidate segments based on the set of scores that consider topic similarity, topic diversity, sequence rules, previous segment cohesion, and next segment cohesion, etc.

The recommend target segment 348 can be from a different series of videos, was produced independently from the selected video segment 341, or produced from a different data source. The recommended target segment 348 is selected to seamlessly and coherently transition topics between independent video series on a common subject. Recommendations guide the user across several independently designed courses in the collection of content 303 to efficiently provide the most relevant information while avoiding redundant topic coverage.

The selected video segment 341 can be a single segment that the user is currently accessing (e.g., a video segment being watched by the users). The query process 340 can be expanded to integrate user data, such as, viewing history information, facets based on metadata, extracted key phrases, etc. as described in further detail. The query process 340 determines a baseline recommendation using vector space retrieval methods on a guidance model (e.g., frequent topic transitions 338) output by the corpus process 320.

Using content-based recommendations without analyzing a syllabus and generating a common vocabulary concentrate results within each course based on the language used by the instructor that may be distinct to each course. Using variants of the scoring function that more heavily weight the mined sequential information improves the diversity of results across courses since recommendations exhibit topic transitions consistent with the original course syllabus. Syllabi are usually constructed hierarchically and apply to several videos grouped into a section of the course. Using the sequence based scoring function, the average overlap for the recommendations is reduced as compared to using baseline content-based recommendation. Accordingly, using the sequence based scoring function supply less redundant recommendations than a conventional system based on content similarity.

Figure 4:
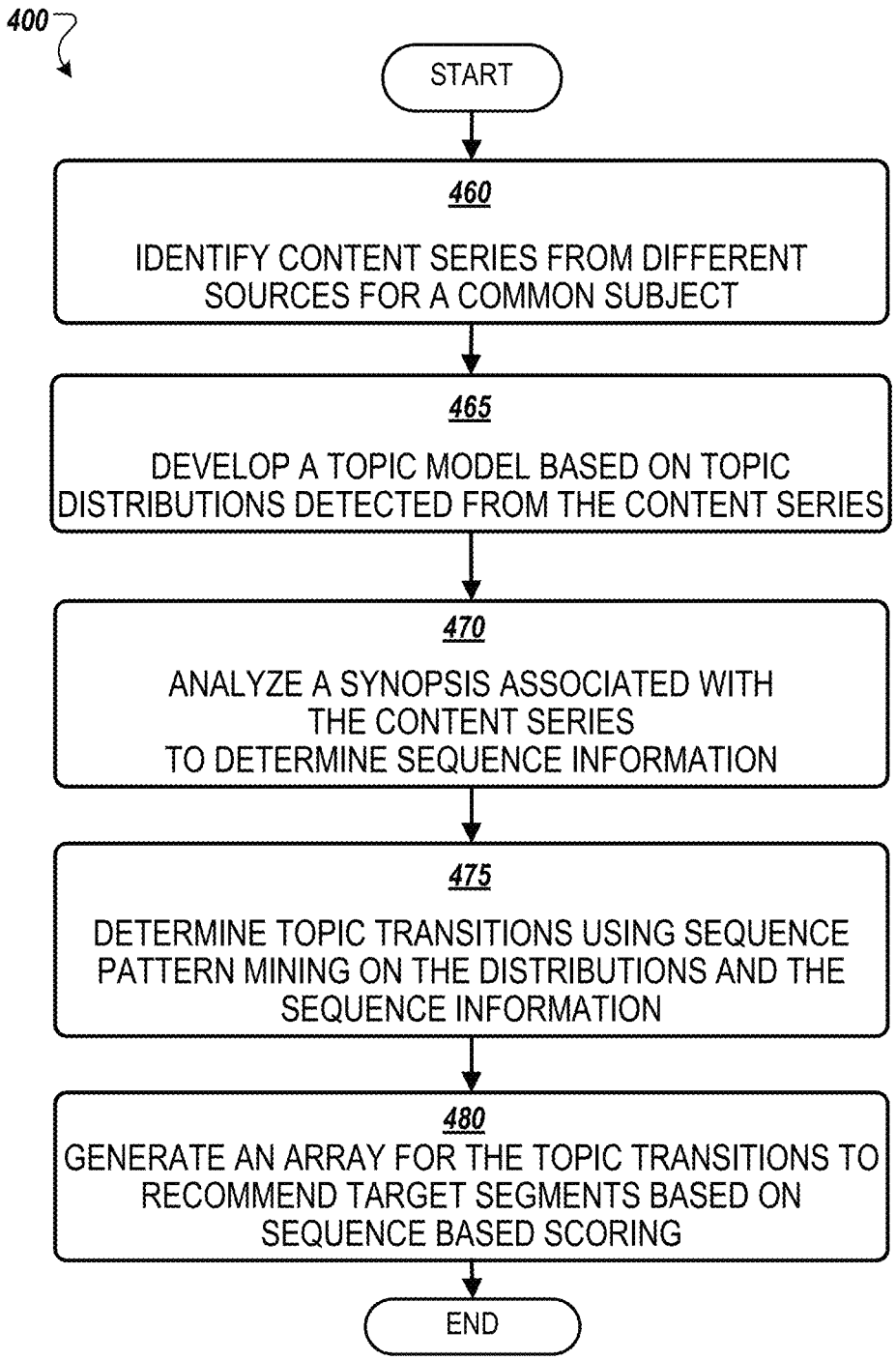
FIG. 4 illustrates a flow chart of an example process of topic guidance based on topic distributions in accordance with example implementations.

FIG. 4 illustrates a flow chart 400 of an example process of topic guidance based on topic distributions in accordance with example implementations. The process 400 is performed by processing logic that may comprise hardware (circuitry, dedicated logic, etc.), software (such as operates on a general purpose computer system or a dedicated machine), or a combination of both. Flow 400 may be performed by the guidance engine 110 of FIG. 1 or 210 of FIG. 2.

According to an example implementation, at block 460, the processing device identifies content series for a common subject. For example, video content can be collected from various courses where video series for each course include topic that overlap with other series. At block 465, the processing device develops a topic model based on topic distributions detected from the segments. At block 470, the processing device analyze a synopsis (e.g., auxiliary information) associated with each video series to determine sequence information for the segments of the video series. At block 475, the processing device determines topic transitions using sequence pattern mining on the distributions and the sequence information. At block 480, the processing device generates an array for the topic transitions to recommend target segments based on sequence based scoring.

Using content-based recommendations without analyzing a syllabus and generating a common vocabulary concentrates results within each course based on the language used by the instructor that may be distinct to each course. Using variants of the scoring function that more heavily weight the mined sequential information (e.g., frequent topic transitions) improves the diversity of results across courses since recommendations exhibit topic transitions consistent with the original course syllabus. Syllabi are usually constructed hierarchically and apply to several videos grouped into a section of the course. In an example, a user log with tracking information for the order of viewed segments by users. Using the sequence based scoring function(s), the average overlap for the recommendations is reduced as compared to using baseline content-based recommendation. Accordingly, using the sequence based scoring function supply less redundant recommendations than a conventional system based on content similarity.

Figure 5:
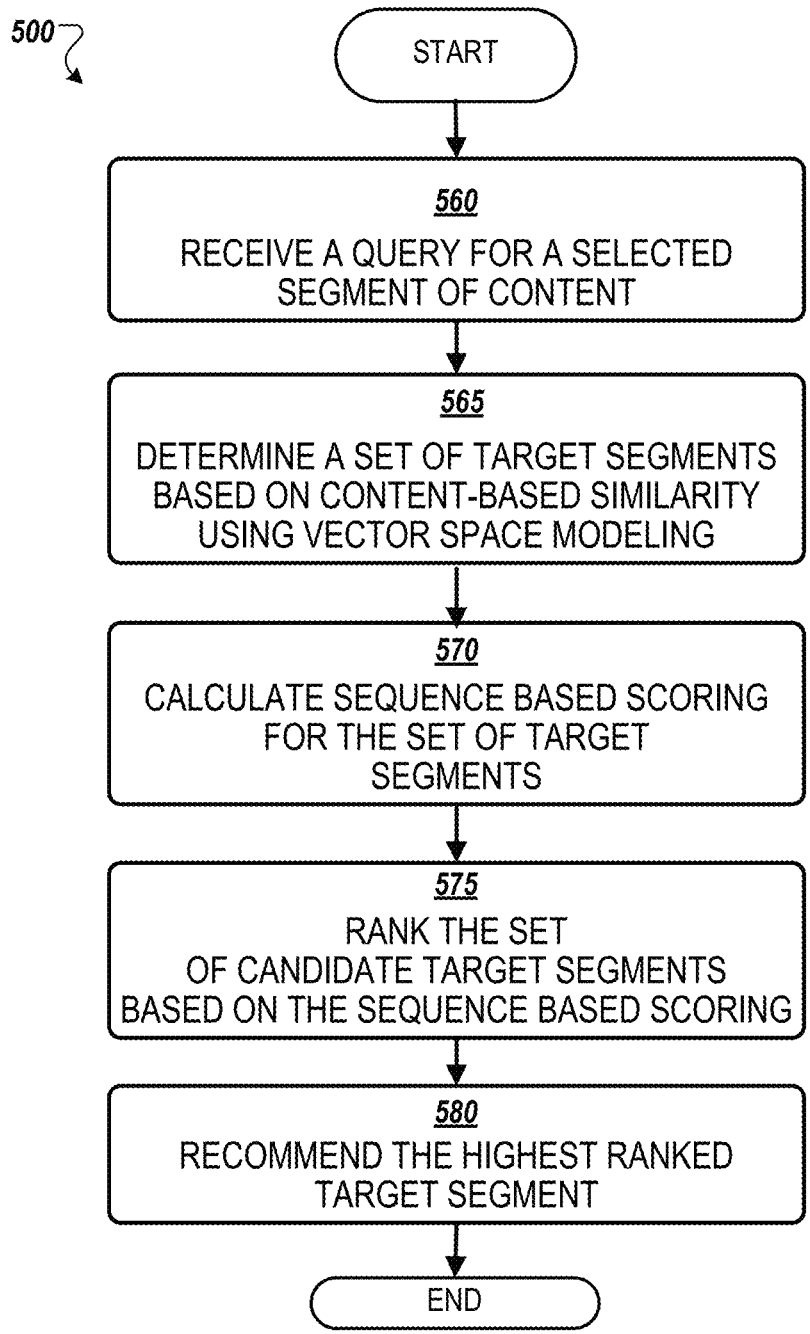
FIG. 5 illustrates a flow chart of an example process of recommending a candidate segment of content according to example implementations.

FIG. 5 illustrates a flow chart 500 of an example process of recommending a candidate segment of content according to example implementations. The process 500 is performed by processing logic that may comprise hardware (circuitry, dedicated logic, etc.), software (such as operates on a general purpose computer system or a dedicated machine), or a combination of both. Method 500 may be performed by the guidance engine 110 of FIG. 1 or 210 of FIG. 2.

According to an example implementation, at block 560, the processing device receives a query for a selected segment of content. At block 565, the processing device determine a set of candidate target segments based on content-based similarity using vector space model. At block 570, the processing device calculates sequence based scoring for the set of candidate target segments. According to an example implementation, the sequence based scoring includes set of scores that use the sequence information from auxiliary sources (e.g., a syllabus). Additional scoring information can be based on supplemental data about a user, such as, location, demographics, profile information, a course enrollment history, viewing history, requests for a recommendation, responses or reaction to recommendations, etc.

Given an initial list of recommended videos, the sequence-based re-ranking module re-orders terms according to one or more scoring criteria. Example scoring criteria can include a topic similarity score, a topic diversity score, a global sequence rule based score, local sequence rule based score, a next video coherence score, a previous video divergence score, etc. The sequence scoring module can apply feature scaling to the set of scores to normalize values into a range (e.g., [0,1]) and linearly fusing the scores with weights. For weights $\alpha$, $\beta$, $\gamma$, $\delta$, $\eta$, $\theta$ and $\varepsilon$, the processing device determines:

$$f(V_q, V_r) = \alpha * \text{Top}_{sim}(V_q, V_r) + \beta * \text{Top}_{div}(V_q, V_r) + \gamma * \text{Top}_{glob\_seq}(V_q, V_r) + \delta * \text{Top}_{loc\_seq}(V_q, V_r) + \eta * \text{Top}_{nxt} + \theta * \text{Top}_{prev} + \varepsilon * CB(V_q, V_r)$$ (Equation 1)

An alignment decision using Equation 1 identifies the target segment from the set of candidate target segments to recommend based on the selected segment. The set of candidate segments can be ordered based on content-based similarity using vector space modeling in view of the array for topic transitions, and then re-ranked based on the sequence based scoring using scoring criteria including topic similarity, topic diversity, sequence rules, previous segment cohesion, and next segment cohesion. The alignment decision uses scoring criteria to determine which candidate target segment out of the set is directed to a topic that best aligns with a topic of the selected segment. The recommended target segment is this highest rank candidate target segment based on frequent topic transactions weighted by sequence information (e.g., using the auxiliary information).

For the topic similarity score, latent topic signatures of query video (Vq) and its recommended video (Vr) are matched in terms of their ids and probability values as well as length of their topic union z. Probability scores of latent topics are matched within a threshold value (e.g., 0.2), for example to determine Jaccard similarity between the latent topic coefficients. Topic similarity score can be generated as Topsim(Vq, Vr)=top_id_sim(x1/z)+top_prob_sim(x2/z), where x1 and x2 is number of matched latent topic ids and probabilities between Vq and Vr:

$$\text{Top}_{sim}(V_q, V_r) = \text{top\_id\_sim}(x_1/z) + \text{top\_prob\_sim}(x_2/z),$$ (Equation 2)

For the topic diversity score, latent topic signatures of Vq and Vr are considered mismatched whenever their respective latent topic ids with probability values exceeding the median value in their topic signatures are mismatched. Topic diversity score can be generated as Topdiv(Vq, Vr)=top_id_div(d1/z)+top_prob_div(d2 len(d1)), where d1 is union of different topic ids within Vq and Vr and d2 is mismatched latent topic ids with higher probabilities between Vq and Vr:

$$\text{Top}_{div}(V_q, V_r) = \text{top\_id\_div}(d_1/z) + \text{top\_prob\_div}(d_2 \text{len}(d_1))$$ (Equation 3)

For the global sequence rule based score, n support (s) and confidence score (c) values are identified from mined global sequential rules matching antecedent values with the topic signature of V and consequent matching the subset of topic signature ids of Vr. Global sequence rule based score can be generated as Topglob seq(Vq, Vr)=$\Sigma_0^n$ c*(y/x)+s/db. Where, db is a number of topic-level sequences in the global sequential database, y is the length of matched subset of topic id signature of Vr and x is the length of topic signature of Vr. To avoid noisy sequence patterns only antecedent matching the topic signature are considered.

$$\text{Top}_{glob\_seq}(V_q, V_r) = \Sigma_0^n c * \left(\frac{y}{x}\right) + s/db$$ (Equation 4)

For the local sequence rule based score, m support (s) and confidence score (c) values are retrieved from mined local sequential rules with antecedent matching subset of the topic signature ids of Vq and consequent matching the subset of topic signature ids of Vr. Local sequence rule based score is generated as Toploc_seq(Vq, Vr)=1/m $\Sigma\_o\^m$ c*(y/x)+s/1db Where, 1db is a number of topic-level sequences in the local sequential database, y is the length of matched subset of topic id signature of Vr and x is the length of topic signature of Vr. For example, sequential rules with antecedent values matching with any subset of the topic signature of Vr can produce insight on the sequence patterns.

$$Top_{loc\_seq}(V_q, V_r) = \frac{1}{m}\Sigma_0^m c * \left(\frac{y}{x}\right) + s/ldb \quad \text{(Equation 5)}$$

For the next video coherence score, Topnxt=Topsim (Vq_next, Vr)+Topsim(Vq_next, Vr next), where Vq_next is the next video in the course sequence of Vq and Vr next is the next video in the course sequence of Vr:

$$\text{Top}_{nxt} = \text{Top}_{sim}(V_{q\_next}, V_r) + \text{Top}_{sim}(V_{q\_next}, V_{r\_next}) \quad \text{(Equation 6)}$$

For the previous video divergence score, Topprev=Topdiv (Vq_prev, Vr), where Vq prev is the previous video in the course sequence of Vq (if any):

$$\text{Top}_{prev} = \text{Top}_{div}(V_{q\_prev}, V_r) \quad \text{(Equation 7)}$$

At block 575, the processing device, ranks the set of candidate target segments based on the mined topic sequencing in view of the selected segment and optimize the ranked candidate segments. At block 580, the processing device recommend the highest ranked target segment to guide the viewer to content on a relevant topic that is non-redundant.

Figure 6:
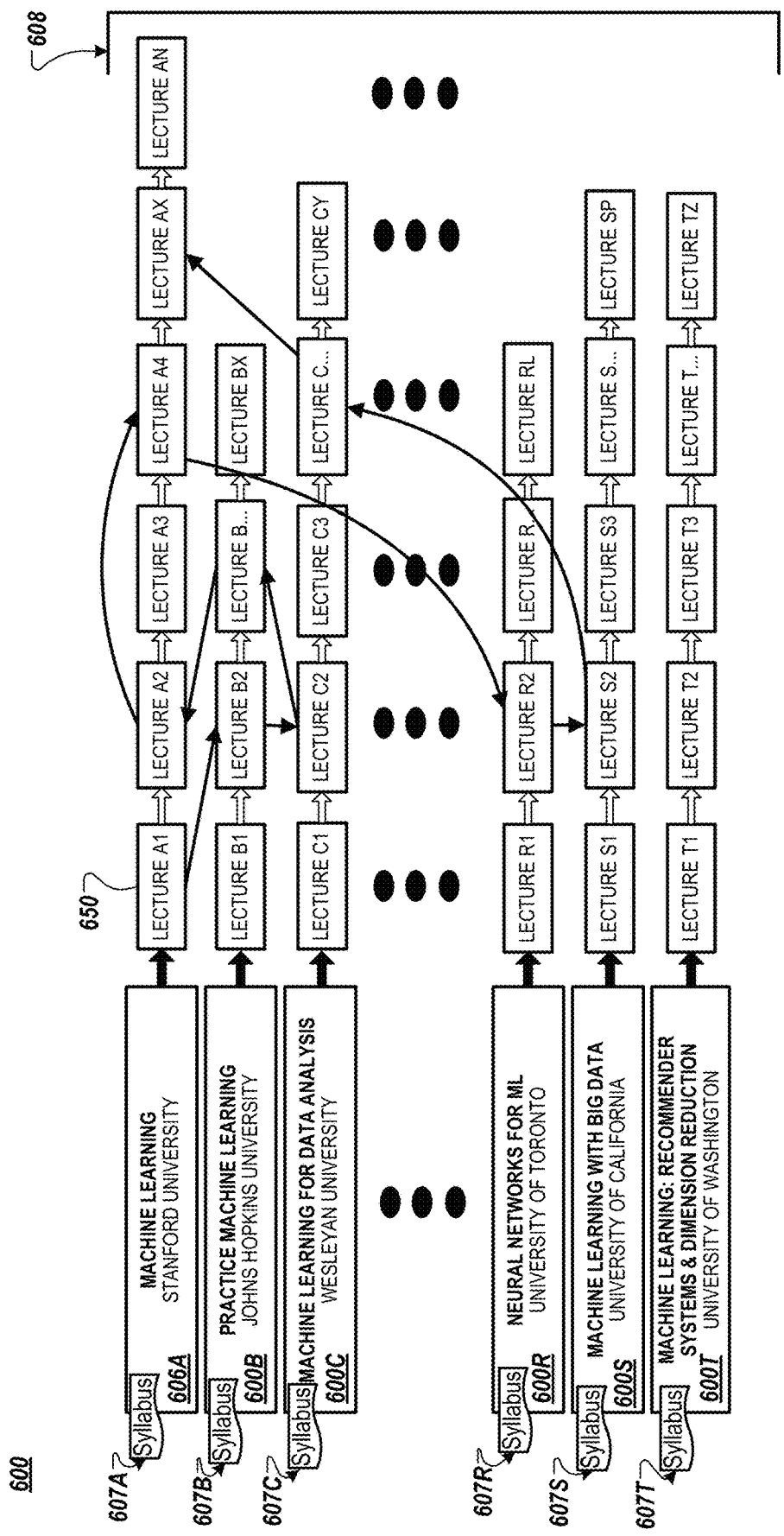
FIG. 6 illustrates an example trajectory for topic guidance using sequence mining in accordance with an example implementation.

FIG. 6 illustrates an example trajectory 600 for topic guidance using sequence mining in accordance with an example implementation. The example trajectory 600 illustrates multiple recommendations to guide a viewer through a corpus of content 608 on a common subject, for example, machine-learning.

The corpus of content 608 comprises multiple series of lectures (e.g., LecturesA-T) from independent sources (e.g., 606A-606T). Each series of LecturesA-T is from a different source 606A-606T has a syllabus (e.g., 607A-T) and includes multiple segments (e.g., LectureA1-AN). For example, the Machine Learning LectureA series with syllabus 607A is from Stanford University 606A and includes segment of content LectureA1, LectureA2, LectureA3, LectureA4, LectureAX, LectureAN with topics that are relevant to the subject of the corpus, machine-learning. Each segment can address one or more latent topics.

The corpus of content 608 on the common subject can be processed to generate a guidance model as described above in reference to FIGS. 1-4. For example, using topic guidance process 400 of FIG. 4, a topic guidance engine (e.g., 210 of FIG. 2) can analyze each segment (e.g., LectureA1-AN, LectureB1-BX, LectureC1-CY, Lecture R1-RL, Lecture S1-SP, Lecture T1-TZ, etc.) of each series (e.g., LecturesA-T) to generate a global topic model of latent topics and mine sequence patterns for the latent topics. The topic guidance engine can detect if one or more latent topics in each segment are relevant to the common subject. The global topic model for the machine learning corpus 608 associates each video segment (LectureA1-TZ) with a distribution over each of the topics based on a probability distribution using Latent Dirichlet Allocation.

Additionally, the topic guidance engine can use the syllabi 607A-T for each series LecturesA-T to mine sequence patterns for the latent topics and determine frequent topic transitions in view of the global topic model. The topic guidance engine generates a guidance model for the corpus 608 and assigns an array for the topic signature from the distribution to each video segment LectureA1-TZ. The topic signature is used to identify a next segment from a set of candidate segments, where the next segment is directed to non-redundant topics that align with topics of the selected segment based on frequent topic transactions weighted by sequence information from auxiliary information. The set of candidate segments are ranked or ordered based on content-based similarity using vector space modeling in view of the array for topic transitions, and re-ranked based on the sequence based scoring. The sequence based scoring can include factors for topic similarity, topic diversity, sequence rules, previous segment cohesion, and next segment cohesion.

In an example, a student accessing the corpus 608 (e.g., with a video player via an internet interface) can start an unstructured learning experience by viewing LectureA1. In the example starting at 650, the topic guidance engine can query the guidance model to recommend a target segment to watch after segment LectureA1. For example, the student may not understand one of the topics LectureA1 and request a recommendation.

The selected segment 650 can be processed to recommend a next segment for the student to watch based on the guidance model as described above in reference to FIGS. 1-3 and 5. For example, using recommendation process 500 of FIG. 5, the topic guidance engine (e.g., 210 of FIG. 2) can determine a set of candidate target segments based on content-based similarity using vector space modeling in view of the selected LectureA1 segment. For example, sequence based scoring of the selected LectureA1 segment may indicate that LectureA2, LectureB1, LectureB2, LectureR2 include topics relevant to LectureA1.

The topic guidance engine can calculate a set of scores for each candidate segment LectureA2, LectureB1, LectureB2, LectureR2 and rank the scores based on the mined topic sequence. For example, if the sequence patterns indicate latent topics in LectureA1 frequently transitions to topics in lectures LectureB1, LectureB2, the process can rank LectureB1, LectureB2 as better candidates than LectureR2.

According to an example implementation, the topic guidance engine can consider supplemental information, such as segments the students previously viewed (e.g., user logs). For example, if the student previously viewed segment LectureB1, the process can re-rank LectureB2 above LectureB1 to avoid having the student repeat redundant material. Therefore the topic guidance engine can recommend the review LectureB2.

Example trajectory 600 shows how the query process can be repeated on-the-fly to update the output recommendations when the student views another segment. For example, LectureC2 can be recommended after the student views LectureB2, LectureB . . . can be recommended after the student views LectureC2, LectureA2 can be recommended after the student views LectureB . . . , LectureA4 can be recommended after the student views LectureA2, LectureR2 can be recommended after the student views LectureA4, LectureS2 can be recommended after the student views LectureR2, LectureC . . . can be recommended after the student views LectureS2, and LectureAX can be recommended after the student views LectureC . . . , etc. The recommended video segments are selected to seamlessly and coherently transition topics between independent video series on a common subject. Recommendations guide a user across several independently designed courses to efficiently provide the most relevant information while avoiding redundant topic coverage.

Figure 7:
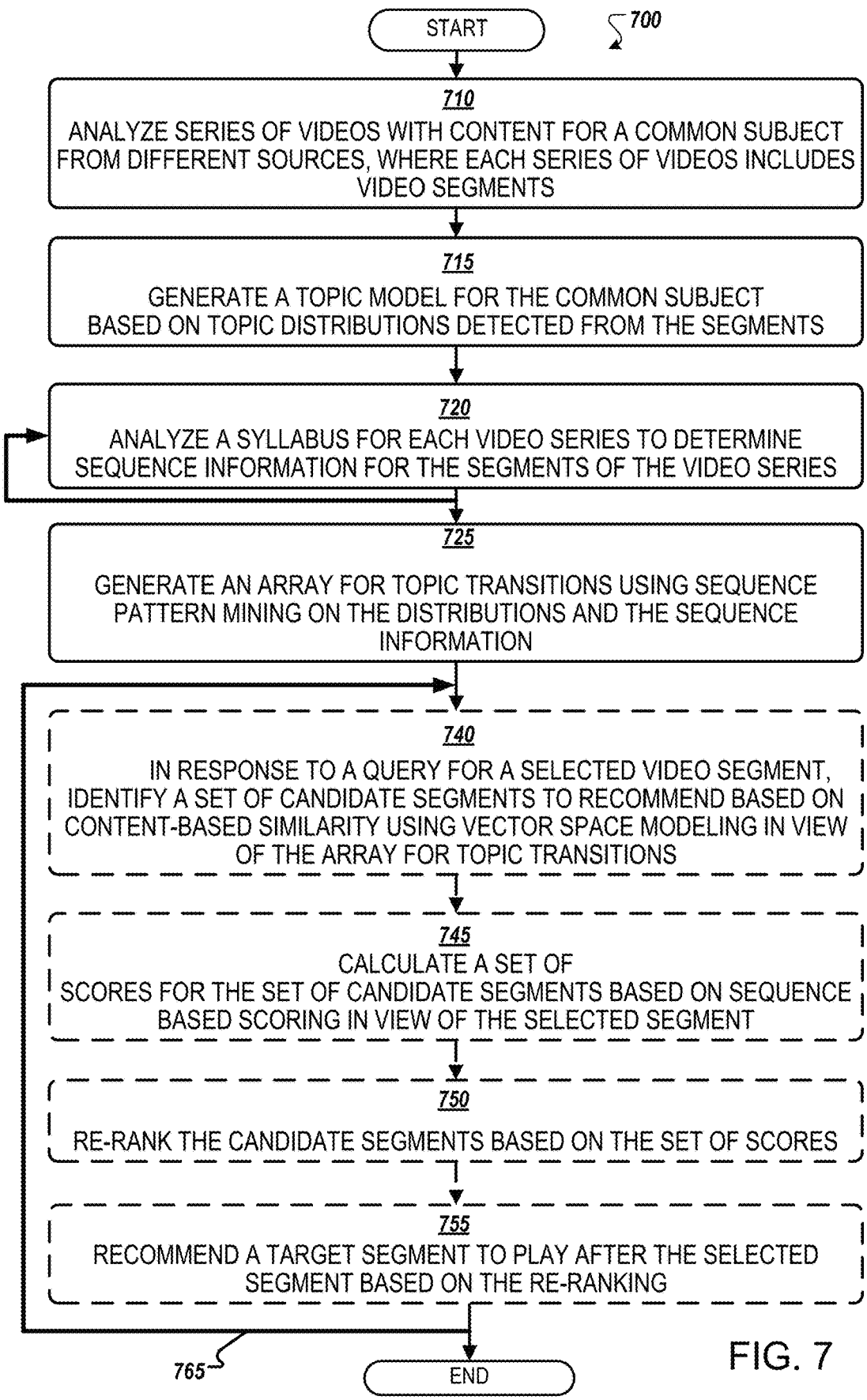
FIG. 7 illustrates a flow chart of an example process for topic guidance using sequence mining of video content according to example an implementation.

FIG. 7 illustrates a flow chart of an example process for topic guidance using sequence mining of video content according to example an implementation. The process 700 is performed by processing logic that may comprise hardware (circuitry, dedicated logic, etc.), software (such as operates on a general purpose computer system or a dedicated machine), or a combination of both. Method 700 may be performed by the guidance engine 110 of FIG. 1. Though method 700 is described below as being performed by the guidance engine, method 700 may also be performed by other processing logic.

Blocks 710-725 are directed to generating a guidance model and creating segment signatures for segments of content. Blocks 710-725 described an adaptable process to use published information for the content that allows for adding content or auxiliary information (e.g., syllabi, frameworks, documents) to the corpus and using the existing topic models, mined pattern sequences, guidance models, etc. without having to recreate each element. That is, blocks 710-725 can generate a guidance model that can be updated to add sequence patterns rather than rebuilding models in response to a content change.

At block 710, the processing device analyzes series of videos with content for a common subject from different sources, where each series of videos includes video segments. At block 715, the processing device generates a topic model for the common subject based on topic distributions detected from the segments. At block 720, the processing device analyzes a syllabus (e.g., auxiliary information, user log, etc.) for each video series to determine sequence information for the segments of the video series. At block 725, generating an array for topic transitions using sequence pattern mining on the distributions and the sequence information.

Content level similarity along with sequence patterns of latent topics are used to recommend a sequence of videos that reinforces conceptual sequential consistency to handle updates to content that periodically change, for example, with new instructors, updated editions, evolving trends, etc.

Blocks 740-755 are directed to a query process for providing a recommendation based on a selected segment using the array for the selected segment generated at block 725. Blocks 740-755 can be repeated in response to request for recommendations independent or asynchronously from repeating blocks 710-725.

At block 740, the processing device in response to a query for a selected video segment, identifies a set of candidate segments to recommend based on content-based similarity using vector space modeling in view of the array for topic transitions. At block 745, the processing device calculates a set of scores for the set of candidate segments based on the sequence based scoring in view of the selected segment. At block 750, the processing device re-ranks the candidate segments based on the set of scores. At block 755, the processing device recommends a target segment to play after the selected segment based on the re-ranking. At block 765, the processing device can repeat blocks 740-755 in response to request for recommendations without repeating blocks 710-725.

Figure 8:
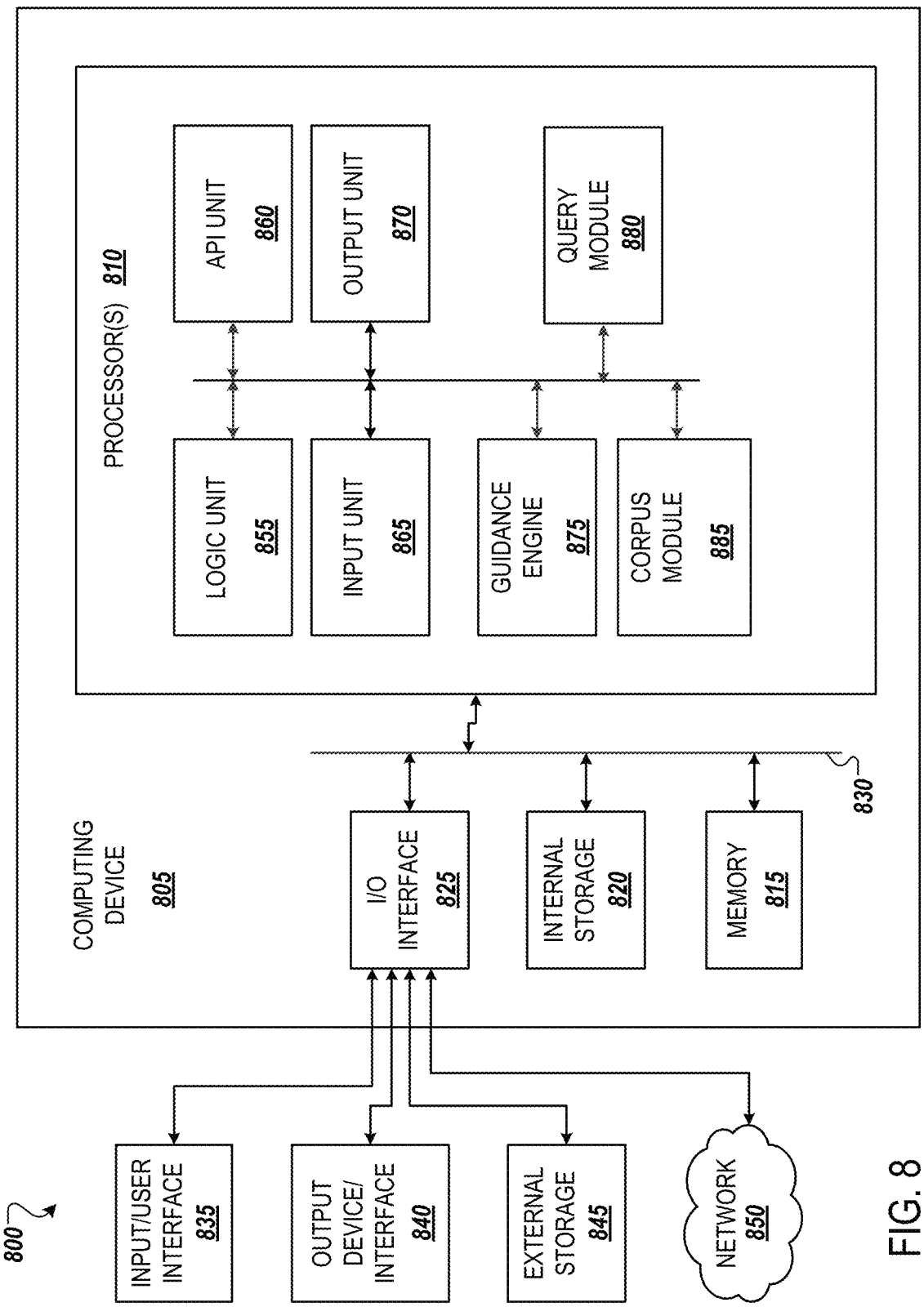
FIG. 8 illustrates an example server computing environment with an example computer device suitable for use in example implementations.

FIG. 8 illustrates an example server computing environment with an example computer device suitable for use in example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual that can be used to provide input (e.g., buttons, touchscreen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

The I/O interface 825 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, guidance engine 875, query module 880, and/or corpus module 885. For example, input unit 865, guidance engine 875, query module 880, and/or corpus module 885 may implement one or more processes shown in FIGS. 2-5. The described units and elements can be varied in design, function, configuration, or implementation and are not limited to the descriptions provided.

In some example implementations, when information or an execution instruction is received by API unit 860, it may be communicated to one or more other units (e.g., logic unit 855, output unit 870, input unit 865, guidance engine 875, query module 880, and/or corpus module 885 (e.g., guidance engine, etc.).

Input unit 865 may, via API unit 860, receive videos, metadata, syllabi, transcripts, user data, etc. to analyze, via guidance engine 875, query module 880, and/or corpus module 885. Using API unit 860, corpus module 885 can analyze the content to mine sequential patterns for topic recommendations.

In some instances, logic unit 855 may be configured to control the information flow among the units and direct the services provided by API unit 860, input unit 865, output unit 870, guidance engine 875, query module 880, and/or corpus module 885 in some example implementations described above. For example, the flow of one or more processes or implementations may be controlled by logic unit 855 alone or in conjunction with API unit 860.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "analyzing," "detecting," "determining," "identifying," "scoring," "generating," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
    developing a topic model for a set of video series that include overlapping topics, wherein each video series includes segments directed to one or more of topics, wherein the topic model is based on topic distributions detected from the segments;
    for each video series, analyzing auxiliary information to determine sequence information for the segments of the video series; and
    generating an array for topic transitions using sequence pattern mining on the distributions and the sequence information, wherein a next segment is determined for a selected segment based on an alignment decision using the array and sequence based scoring, wherein the alignment decision using the array and sequence based scores comprises, in response to receiving a query for the selected segment:

determining an ordered list of candidate segments based on content-based similarity using vector space modeling in view of the array for topic transitions;

determining a set of scores for each candidate segment based on the sequence based scoring in view of the selected segment, wherein the sequence based scoring weights candidate segments directed to non-redundant topics that align with topics of the selected segment;

re-ordering the list of the candidate segments based on the set of scores; and recommending the next segment based on the re-ordered list of candidate segments.

2. The method of claim 1, wherein the alignment decision identifies the next segment from a set of candidate segments, wherein the next segment is directed to non-redundant topics that align with topics of the selected segment based on frequent topic transactions weighted by sequence information from the auxiliary information, wherein the set of candidate segments are ranked based on content-based similarity using vector space modeling in view of the array for topic transitions, and re-ranked based on the sequence based scoring.

3. The method of claim 1, wherein the sequence based scoring is determined based on scoring criteria including at least one of a topic similarity score, a topic diversity score, a global sequence rule based score, a local sequence rule based score, a next video coherence score, or a previous video coherence score.

4. The method of claim 1, further comprising determining a topic distribution preference based on segment viewing history of a viewer, wherein determining the set of scores is based on at least in part on weighting a score for the candidate segment based on the viewer's topic distribution preference, and normalizing the set of scores to generate a candidate segment score.

5. The method of claim 1, wherein sequence pattern mining on the distributions further comprises:

mining frequent sequence patterns across video series from different domains; and generate global sequential rules based on the frequent sequence patterns so that the alignment decision using the array to weight a set of candidate segments is to reduce redundant topics between the next segment and the selected segment.

6. The method of claim 1, wherein the sequence based scoring in view of the selected segment further comprises mining sequence patterns based on latent topics associated with the selected segment; and so that the alignment decision using the array to weight a set of candidate segments is to reduce redundant topics between the next segment and the selected segment.

7. The method of claim 1, wherein the set of scores for each candidate segment are weighted based on a confidence score of topic transitions mined from local sequence patterns and global sequence patterns.

8. The method of claim 1, wherein the sequence pattern mining for topic transitions comprises extracting a set of frequent topic transitions, wherein the frequent topic transitions have a pattern length within one or more thresholds that are based on the number of segments associated with each topic.

9. The method of claim 1, wherein the topic model is based on detected latent topic transitions using the sequential pattern mining and sequential rule mining for the sequence of latent topics detected for each segment.

10. The method of claim 9, wherein developing the topic model further comprises analyzing the video series to detect latent topics using at least one of natural language processing and transcript modeling, wherein the latent topics are domain independent based on topic visualization for verification of latent topics quality.

11. A system comprising:

a memory;

a processor operatively coupled to the memory, the processor configured to:

develop a topic model for a set of video series that include overlapping topics, wherein each video series includes segments directed to one or more of topics, wherein the topic model is based on topic distributions detected from the segments;

for each video series, analyze auxiliary information to determine sequence information for the segments of the video series; and generate an array for topic transitions using sequence pattern mining on the distributions and the sequence information, wherein a next segment is determined for a selected segment based on an alignment decision using the array and sequence based scoring, wherein in response to a query for the selected segment being received, the processor is further configured to:

determine an ordered list of candidate segments based on content-based similarity using vector space modeling in view of the array for topic transitions;

determine a set of scores for each candidate segment based on the sequence based scoring in view of the selected segment, wherein the sequence based scoring weights candidate segments directed to non-redundant topics that align with topics of the selected segment;

re-order the list of the candidate segments based on the set of scores; and recommend the next segment based on the re-ordered list of candidate segments.

12. The system of claim 11, wherein the sequence based scoring is determined based on scoring criteria including at least one of a topic similarity score, a topic diversity score, a global sequence rule based score, a local sequence rule based score, a next video coherence score, or a previous video coherence score.

13. The system of claim 11, wherein the instructions are further to:

for each video series associated with a common subject, identifying a focused pattern of topic transitions for the series as a local sequence rule; and weighting candidate segments in the set of candidate segments based on the candidate segment satisfying one or more of the local sequence rules based on the selected segment.

14. The system of claim 11, wherein the set of video series comprises:

a first video series, wherein the segments of the first video series are recorded lectures, wherein auxiliary information of the first video series is a syllabus with a sequence of topics for the segments of the first video series, and at least a second video series wherein the segments of the second video series are different recorded lectures with one or more topics that overlap with the first video series, wherein auxiliary information of the second video series is a syllabus with a different sequence for the one or more topics that overlap.

15. The system of claim 11, wherein the next segment is directed to a topic for a subject in common with the selected segment, wherein the next segment is from a different video series with a different sequence of topics from the video series of the selected segment.

16. The system of claim 11, wherein the alignment decision determines a next segment topic and a selected segment topic align based on the sequence based scoring for factors including topic similarity, topic diversity, sequence rules, previous segment cohesion, and next segment cohesion.

17. A non-transitory computer readable medium, comprising instructions that when execute by a processor, the instructions to:
 develop a topic model for a corpus of content series for a common subject from different sources, wherein each content series comprises content segments for topics of the common subject, wherein the topic model is based on topic distributions detected from the segments;
 for each content series, analyze a syllabus associated with the content series to determine sequence information for the segments of the video series;
 generate an array for topic transitions using sequence pattern mining on the distributions and the sequence information, wherein a next segment is determined for a selected segment based on an alignment decision using the array and sequence based scoring,
 determine an ordered list of candidate segments based on content-based similarity using vector space modeling in view of the array for topic transitions;
 determine a set of scores for each candidate segment based on the sequence based scoring in view of the selected segment;
 re-order the list of the candidate segments based on the set of scores; and
 recommend the next segment based on the re-ordered list of candidate segments.

* * * * *